United States Patent [19]

Wright et al.

[11] Patent Number: 5,669,452
[45] Date of Patent: Sep. 23, 1997

[54] BLADE PLOW WITH VERTICALLY RECIPROCATING BLADES

[75] Inventors: James A. Wright, Oakley; Henry F. Erikson, Victoria; Glenn A. Wolf; James A. Boone, both of Quinter, all of Kans.

[73] Assignee: Quinstar Corporation, Quinter, Kans.

[21] Appl. No.: 689,238

[22] Filed: Aug. 6, 1996

Related U.S. Application Data

[62] Division of Ser. No. 483,922, Jun. 7, 1995, abandoned.

[51] Int. Cl.$^6$ ........................... A01B 49/00
[52] U.S. Cl. .................. 172/685; 172/311; 172/624.5
[58] Field of Search ........................ 172/310, 311, 172/19, 456, 501, 776, 421, 685, 624.5; 111/927

[56] References Cited

U.S. PATENT DOCUMENTS

| | | | |
|---|---|---|---|
| 612,900 | 10/1898 | Heyiman | 172/671 |
| 1,025,830 | 5/1912 | Paul | 172/671 |
| 1,645,507 | 10/1927 | Moyer et al. | 172/720 |
| 3,744,570 | 7/1973 | Krammer | 172/310 |
| 3,965,989 | 6/1976 | Ward | 172/310 |
| 4,033,417 | 7/1977 | Rau et al. | 172/675 |
| 4,050,522 | 9/1977 | Ralstor et al. | 172/311 |
| 4,050,523 | 9/1977 | Poland | 172/311 |
| 4,054,007 | 10/1977 | Moore | 172/624.5 |
| 4,150,725 | 4/1979 | Crumrine | 172/311 X |
| 4,159,038 | 6/1979 | Eichenberger | 172/311 |
| 4,492,272 | 1/1985 | Jensen | 172/178 |
| 4,519,460 | 5/1985 | Gust | 172/176 |
| 4,619,330 | 10/1986 | Machnee | 172/311 |
| 4,729,435 | 3/1988 | Urich | 172/657 |
| 4,825,655 | 5/1989 | Buchl et al. | 60/546 |
| 4,825,959 | 5/1989 | Wilhelm | 172/720 |
| 4,834,189 | 5/1989 | Peterson et al. | 172/624.5 |
| 5,303,779 | 4/1994 | Friggstad | 172/311 |
| 5,398,770 | 3/1995 | Harden | 172/730 |

FOREIGN PATENT DOCUMENTS

| | | | |
|---|---|---|---|
| 755717 | 11/1933 | France | 172/624.5 |
| 0161155 | 9/1964 | U.S.S.R. | 172/657 |

*Primary Examiner*—Terry Lee Melius
*Assistant Examiner*—Robert Pezzuto
*Attorney, Agent, or Firm*—Herzog, Crebs & McGhee, LLP

[57] ABSTRACT

A blade plow preferably formed by three frame sections hingedly coupled together includes a ground or terrain contour following mechanism within each frame section. The contour mechanism allows the middle blade to be raised and lowered to maintain the entire central blade horizontal relative to the plow frame and at a constant depth within the ground. Additional "fixed" blades are hydraulically setable for depth of cut. The terrain contour following mechanism allows for larger frame widths without the usual tendency of smaller width frames to buckle due to ground unevenness.

8 Claims, 7 Drawing Sheets

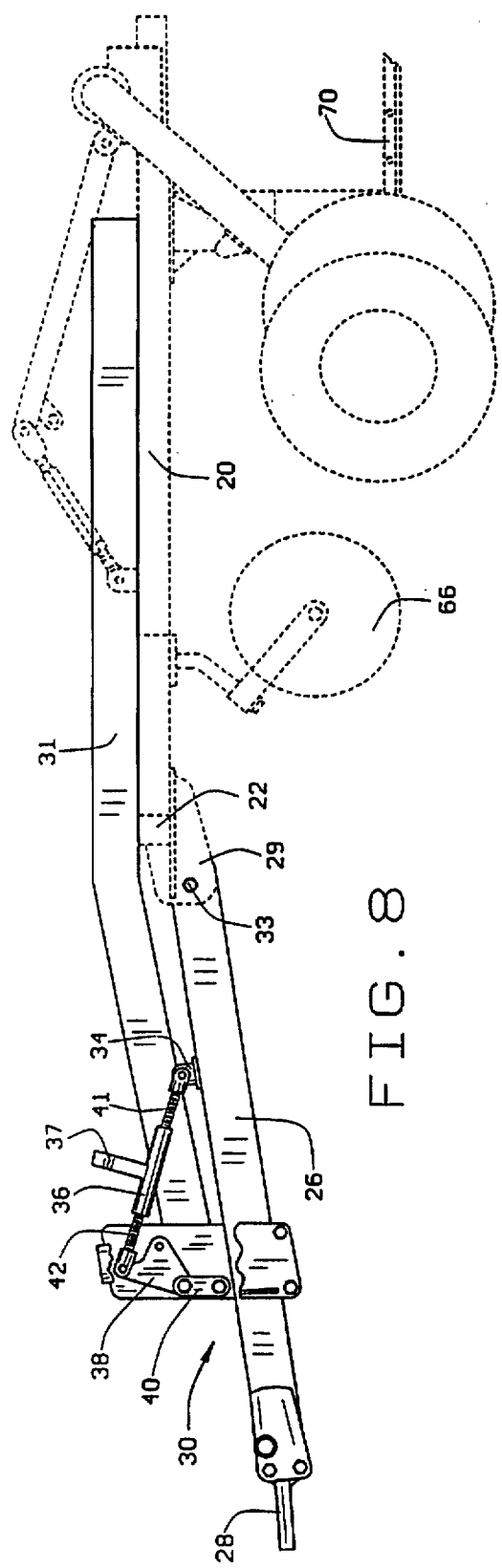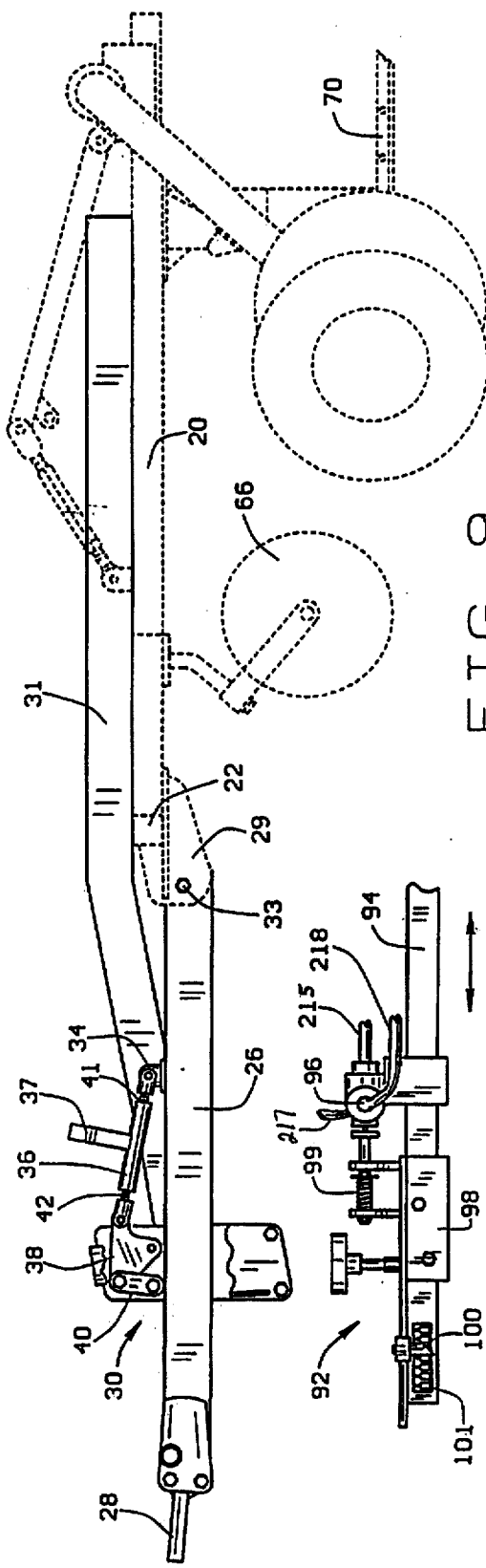

BLADE PLOW WITH VERTICALLY RECIPROCATING BLADES

This is a division of application Ser. No. 08/483,922 filed Jun. 7, 1995, now abandoned.

FIELD OF THE INVENTION

The present invention relates to plows and, more specifically, to blade plows having blade adjustment mechanisms.

BACKGROUND OF THE INVENTION

Plows have been known and used for centuries. Early plows allowed the operator to plow only one furrow or row per pass. The task of plowing was, at a minimum, time consuming regardless of the amount of acreage being plowed. Eventually, and especially with the advent of tractors, plows were designed that permitted one to plow a plurality of rows during each pass. Because more rows were plowed during each pass, the task was completed in less time. This also allowed more acreage to be tilled and planted. The plows utilized an elongated frame that carried a plurality of blades in regular intervals for row spacing.

The elongated frame type plow is currently being utilized. However, it has been recognized that as the width of the frame increases, so does the tendency for the frame to buckle as the fixed position blades encounter varying terrain. As the plow is towed on the ground, each blade may encounter differing terrain along the width or length of the plow. This causes some of the blades to dig deeper into the soil while at the same time causing some of the blades to lift above the soil. Such a condition is not desirable. In order to derive the full effect of the blade, it is necessary to maintain a constant set depth for the blade within the soil.

While various mechanisms have been devised to allow the blades to essentially follow the contour of the ground during plowing, they are deficient in several respects. One such deficiency is the manner in which the blade is caused to raise from the ground upon encountering higher terrain. In the prior art, the blades are attached to members that pivot with respect to the frame when terrain contours are encountered. Pivoting motion naturally causes the blades to be arcuately raised from the ground. Because the blade is arcuately raised from an initially horizontal position with respect to the ground, some parts or portions of the blade will be higher or lower with respect to other parts or portions of the same blade. Thus, the entire blade will not be horizontally maintained relative to the ground upon encountering terrain contours.

Additionally, each blade of the plow is usually coupled to a central terrain contour following mechanism such that every blade is arcuately moved in response to terrain contours.

For instance, U.S. Pat. No. 3,744,570, Krammer, issued Jul. 10, 1973, is for a rectangular frame cultivator having front and rear pairs of blades supported from the frame. The front and rear pairs of blades are each coupled to a central control wheel that follows the contour of the ground. Additionally, front and rear pairs of blades are coupled together via a balance or rocker arm. The coupling creates opposite movement of the front and rear pairs of blades when encountering uneven terrain. However, the blades are coupled to pivoting members such that the blades undergo arcuate movement.

In U.S. Pat. No. 4,519,460, Gust, issued May 28, 1985, a compaction and support apparatus that includes a plurality of tillers in spaced relationship is disclosed. A central pair of wheels is pivotally attached to the frame and is coupled to a hydraulic actuating mechanism. The hydraulic actuating mechanism actuates secondary hydraulic mechanisms that are coupled to rear wheel pairs. As the central pair of wheels follow the terrain contours, the hydraulic actuating mechanism controls the secondary hydraulic mechanisms to raise and lower the rear wheel pairs. Again, however, the blades are caused to make an arcuate travel path from an initial lowermost setting as the rear wheel pairs are raised.

U.S. Pat. No. 4,033,417, issued to Rau et al. on Jul. 5, 1977 discloses an agricultural machine that includes a support connectable with a plurality of agricultural tools. Again, the tools are mounted for pivotal movement as the ground wheel encounters uneven terrain.

Further, most plows of the prior art do not allow large frame widths and thus must be constructed in smaller frame widths with a plurality of hinge points therebetween.

It is thus an object of the present invention to provide a plow wherein longer frame widths are possible.

It is another object of the present invention to provide a plow having a terrain contour following mechanism that raises the blades vertically from the ground.

SUMMARY OF THE INVENTION

The present invention is a towable blade plow having a terrain contour adjustment mechanism that vertically raises and lowers a blade of the plow in response to ground contour during plow travel.

In one embodiment, the plow includes a terrain contour or flex mechanism that carries a blade and which is operatively coupled to a wheel that raises and lowers the associated blade. The wheel is adapted to ride on the ground during plowing so as to follow the varying contours of the terrain. Once the depth of cut of the terrain contour blade is set relative to the ground, the contour blade correspondingly raises and lowers in response to the raising and lowering of the wheel as the wheel follows the ground contours. The plow also includes a plurality of other blades each one of which is attached to one end of an individual arm or standard that is attached at the other end to the frame. The other blades are thus at fixed height relative to the frame.

The frame rides on wheels that are attached to arms which are pivotally attached to the frame. The pivoting arms each have an associated extending and retracting device to push the pivoting arm downward or pull the pivoting arm upwards. This adjusts the height of the frame relative to the ground. While the fixed height blades ride up and down as the frame rides up and down on its wheels in response to ground contours, the terrain contour mechanism and associated blade follow any contour aberrations not encountered by the frame wheels to raise and lower the contour blade independent of the frame.

In the preferred embodiment, the plow is comprised of three sections each frame section having one flex mechanism along with a plurality of fixed blades. Each flex mechanism is situated as the center blade of each frame section with right and left fixed blades adjacent the center flex mechanism. The depth of cut of the plurality of fixed blades is set by changing the height of the frame relative to the ground. In this manner, the fixed blades are maintained at the setable, fixed distance into the ground. The depth of cut and the frame height is controlled by a hydraulic system that includes hydraulic depth cylinders that raise and lower the overall frame via the pivoting wheel arms. The hydraulic system is coupled to and supplied pressurized hydraulic fluid by the hydraulic take-off from the tractor or towing vehicle.

The frame sections are hingedly connected to define a middle or center frame section, a left frame section, and a right frame section. Thus each frame section may tilt with ground contours relative to the adjacent frame section in addition to the independent movement of the contour mechanism. Because of the center contour mechanism, each frame section may be longer than is achieved in the prior art plows due to the flexibility of the structure. Thus, the overall effective length of plowing is increased without sacrificing flexibility or creating buckling tendencies.

According to an aspect of the three frame section blade plow, the middle frame section contour mechanism is automatically raised when the adjustably fixed blades are raised by the hydraulic depth control cylinders. However, as noted above, the depth of cut of the flex mechanism blade is setable and independent of the other fixed blades. The outer two frame sections fold upwardly for roading. The middle frame contour mechanism and the two outer frames are automatically raised when the plowing is complete and the fixed blades are raised. Walking dual wheels associated with the middle frame section are coupled to a rockshaft to raise the middle contour mechanism through a link coupled to the rockshaft and a lever with a roller contacting a bracket on the contour mechanism.

The plow also includes a blade depth indicator that is calibrated to display the actual or true depth of the adjustably fixed blades within the ground. The indicator, and adjustment mechanism, are located near the front of the plow.

In addition, the plow is designed with an over-the-frame tongue that includes a bellcrank/ratchet assembly to allow the pitch of the frame relative to the ground, and thus the blades relative to the ground, to be adjustably setable. The tongue members are pivotally attached to the frame to allow such pitch setting. The tongue members are attached to the top of the middle frame in order to provide trash clearance.

BRIEF DESCRIPTION OF THE DRAWINGS

So that the manner in which the above-recited features, advantages, and objects of the present invention are attained and can be understood in detail, a more particular description of the invention, briefly summarized above, may be had by reference to the embodiment thereof which is illustrated in the appended drawings.

It is noted, however, that the appended drawings illustrate only a typical embodiment of this invention and are therefore not to be considered limiting of its scope, for the invention may admit to other equally effective embodiments. Reference the appended drawings wherein:

FIG. 3 is an enlarged view of the blade depth controller and indicating device;

FIG. 8 is an enlarged side elevation view of the plow frame particularly depicting the over-the-frame tongue and frame leveling mechanism in a first extended position; and FIG. 9 is an enlarged side elevation view of the plow frame particularly depicting the over-the-frame tongue and frame leveling mechanism in a second extended position.

DETAILED DESCRIPTION

Figure 1:
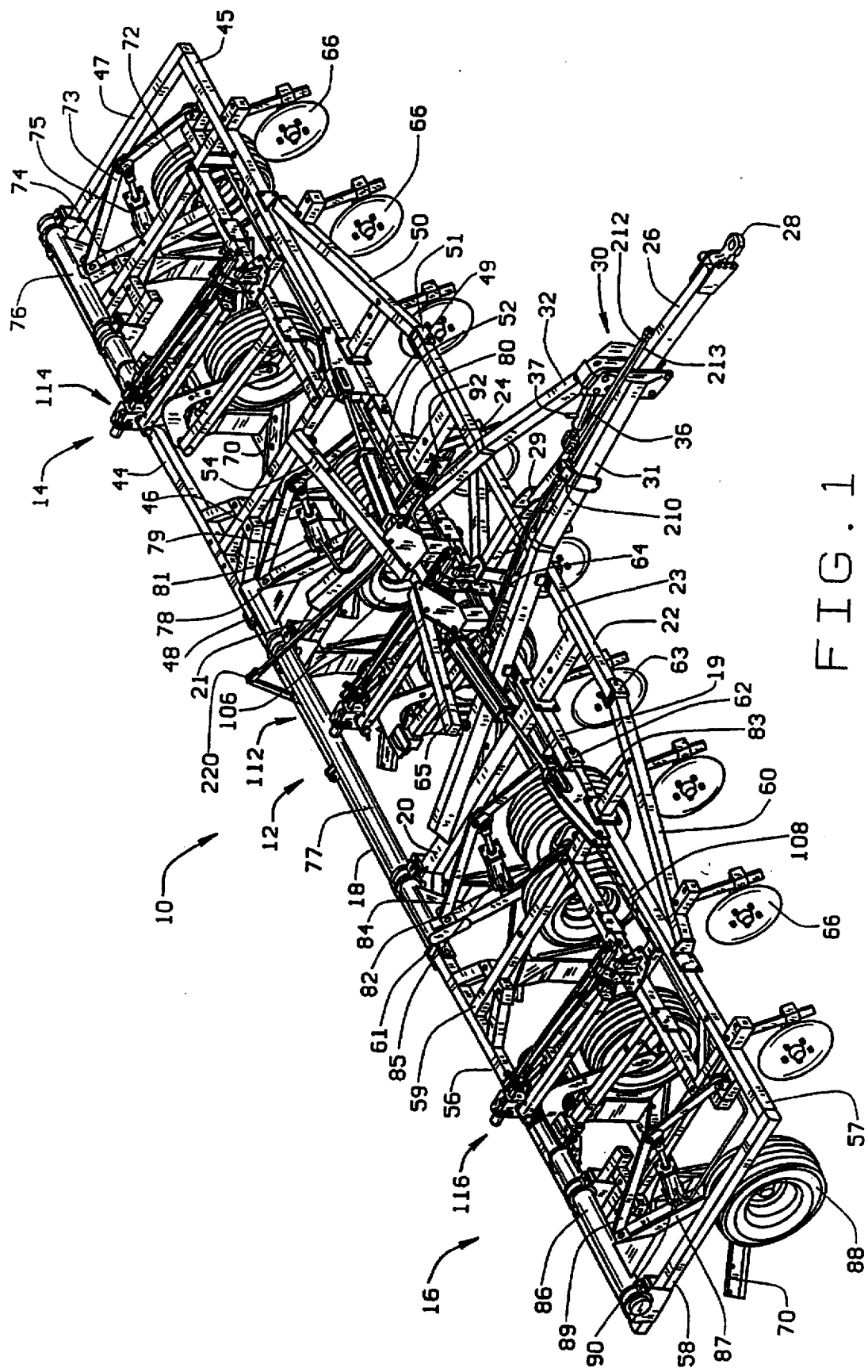
FIG. 1 is a perspective view of the preferred embodiment of the three frame section blade plow incorporating the present ground contour or flex mechanism.

Referring now to FIG. 1 there is shown a blade plow generally designated 10. The blade plow 10 has three frame sections; a middle or center frame 12, a right frame 14, and a left frame 16 as viewed from the front. The plow 10 is adapted to be towed behind a vehicle such as a tractor. The plow 10 is shown with the frame sections 12, 14, 16 in the extended or down position, ready for plowing once the depth of cut of the blades is set as described hereinbelow. The right and left sections 14, 16 fold upwardly with respect to the middle section 12 with the top extending inwardly for transportation of the plow, which is known as roading.

The structure of the middle frame 12 consists of a rear cross-member 18 and a front cross-member 19 that are rigidly attached to a left transverse member 20 and a right transverse member 21 thereby forming a rectangular frame. Disposed forward of and parallel to the front cross-member 19 is a forward support member 22 that is rigidly attached to the front cross-member 19 by a left forward transverse member 23 and a right forward transverse member 24. Rigidly attached to the forward support member 22 is a pivot bracket or hinge assembly 29 that hingedly couples a transversely extending tongue 26 to the forward support member 22. The tongue 26 terminates in a hitch 28 at one end and pivotally attaches to the hinge assembly 29 at the opposite end. The hitch 28 is adapted to releasably couple the plow 10 to a tractor (not shown) or other implement capable of towing the plow 10 and providing a hydraulic hookup system and coupling therefor.

Disposed approximately midway along the tongue 26 is a support bracket/bellcrank mechanism 30 to which is connected a left overtongue support member 31 and a right overtongue support member 32. The mechanism 30, as described hereinbelow in conjunction with other parts so described, allows the pitch of the overall frame to be variably setable relative to the tongue 26. Both the left and right overtongue support members 31 and 32 extend over the middle frame 12 and are attached to the top of the forward support member 22, the top of the front cross-member 19, and to the top of the left and right transverse members 20, 21 respectively. By having the overtongue support members 31, 32 extend over and attach to the middle frame 12, the middle frame 12 is given added strength. Additionally, the plow has a greater trash clearance by virtue of this over-the-frame tongue design.

With reference to FIGS. 8 and 9, the manner and operation of the tongue connection to the frame is more easily discerned. The tongue 26 is operatively coupled to the support bracket/bellcrank mechanism 30 and pivotally attached at 33 to the hinge assembly 29 and thus the frame. A bracket 34 is fixed to the top surface of the tongue 26 to which is pivotally attached one end of an adjustment cylinder 36. The other end of the adjustment cylinder 26 is coupled to a bellcrank 38 that is in turn coupled to a bellcrank linkage 40. The adjustment cylinder 36 utilizes threaded rods 41, 42 as attachment means and to raise and lower the tongue 26 relative to the frame of the plow in the following manner in order to change the pitch or angle of the plow frame relative to the tongue 26 and the ground. A ratchet handle 37 is operatively coupled to the cylinder 36 for mechanically expanding or contracting the threaded rods 41, 42 in order to change the pitch of the overall plow frame. Movement of the handle 37 in one direction or the other contracts or expands the rods 41, 42 depending on whether it is desired to provide more angle or less angle.

In FIG. 8 the rods 41, 42 are fully extended through turning of the ratchet handle 37 wherein, through the bellcrank 38 and the linkage 40, the tongue 26 is in its fully downward position. This corresponds to the fully tilted position of the frame. In FIG. 9 the rods 41, 42 are fully contracted through turning of the ratchet handle 37, wherein, through the bellcrank 38 and the linkage 40, the tongue 26 is in its fully upward position. This corresponds to the flat or horizontal position of the frame. In this manner, the overall pitch of the frame is adjustably setable from the horizontal position through the fully tilted position.

The tongue 26 actually angles or tilts with respect to the tongue 26 when the cylinder 36 contracts and expands. However, since the tongue 26 is attached to the tractor, the frame will actually tilt with respect to the tongue 26.

The hitch 28 is, of course, adapted to be releasably coupled to a tractor or other moving vehicle which sets the height of the tongue relative to the ground since the tractor hitch (not shown) is at a set height. Because the height of the tongue 26 is fixed by the height of the tractor hitch (not shown), setting the mechanism 30 in the downward position as per FIG. 8 tilts the frame of the plow relative to the ground. Because the height of the tongue 26 is fixed by the height of the tractor hitch (not shown), the upward position as in FIG. 9 maintains the frame of the plow level with or horizontal to the flat ground. It should be understood that the bellcrank mechanism 30 allows for a range of movement of the tongue 26 so as to create a range of pitches of the plow frame relative to the ground.

With reference back to FIG. 1, the right frame 14 structure consists of a rear cross-member 44 and a front cross-member 45 that are rigidly attached to a left transverse member 46 and a right transverse member 47 so as to form a rectangular frame. The right frame 14 is pivotally attached to the middle frame 12 by a rear hinge 48 that pivotally couples the rear cross-member 44 of the right frame 14 to the rear cross-member 18 of the middle frame 12, and by a front hinge 49 that pivotally couples the front cross-member 45 of the right frame 14 with the front cross-member 19 of the middle frame 12. Additionally, the right frame 14 has a front angle member 50 that angularly extends from the front cross-member 45 and is pivotally attached to the forward support member 22 of the middle frame 12 via a hinge 51. The front angle member 50 carries discs 66 and provides rigidity to the overall frame.

Operatively coupled to and between the middle frame 12 and the right frame 14 is a hydraulic cylinder 52. The hydraulic cylinder 52 permits the right frame 14 to pivot upwards through hinges 48, 49, 51 with the top towards the middle of the plow 10 to rest against an arm 54 extending from the middle frame 12. The right frame 14 is releasably attached to the arm 54 by a pin or the like (not shown) to prevent the right frame 14 from falling down. This folding is necessary to transport or road the plow as it would be too wide without folding.

The left frame 16 consists of a rear cross-member 56 and a front cross-member 57 that are rigidly attached to a left transverse member 58 and a right transverse member 59 so as to form a rectangular frame. The left frame 16 is pivotally attached to the middle frame 12 by a rear hinge 61 that pivotally couples the rear cross-member 56 of the left frame 16 to the rear cross-member 18 of the middle frame 12, and by a front hinge 62 that pivotally couples the front cross-member 57 of the left frame 16 with the front cross-member 19 of the middle frame 12. Additionally, the left frame 16 has a front angle member 60 that angularly extends from the front cross-member 57 and is pivotally attached to the forward support member 22 of the middle frame 12 via a hinge 63. Like the front angle member 50 of the right frame 14, the front angle member 60 carries discs 66 and provides support.

Operatively coupled between the middle frame 12 and the left frame 16 is a hydraulic cylinder 64. The hydraulic cylinder 64 permits the left frame 16 to pivot upwards via hinges 61, 62, and 63 and towards the middle of the plow 10 to rest against an arm 65 extending from the middle frame 12. Again, this folding is necessary to transport or road the plow as it would be too wide without folding. The left frame section 16 is thereafter releasably attached to the arm 54 by a pin or the like (not shown).

The hydraulic cylinders 52 and 64 are coupled to the hydraulic take-off (not shown) of the tractor or towing vehicle in order to supply and remove pressurized hydraulic fluid to and from the cylinders 52 and 64 as is well known in the art. In the extended state as depicted in FIG. 1, the cylinders 52 and 64 are filled with pressurized hydraulic fluid forcing the right and left frame sections 14, 16 into the downward or plowing position. When it is desired to road the plow, the pressurized hydraulic fluid is vented or released from the cylinders 52, 64 thereby pulling the right and left frame sections 14, 16 into the raised or roading position. Thereafter, as indicated above, the right and left frame sections 14, 16 are locked to the arms 45 and 65 respectively.

Each frame section 12, 14, and 16 carries a plurality of discs each designated 66 that cut foliage laying on the ground allowing the blades 70 to pass therethrough without catching the foliage. In the preferred embodiment, each frame section 12, 14, 16 is eleven to twelve (11–12) feet in width and carries three (3) V-shaped blades, the V-shaped blades being generally designated 70. Each V-shaped blade is preferably four (4) feet wide and is designed as a low lift, undercutting blade suitable to slice two to six (2–6) inches under the surface of the ground.

Two of the blades 70 on each frame section 12, 14, 16 are maintained at a common vertical depth or downward height relative to the frame by the attachment to its respective standard. The third blade 70, being the center blade, on each frame section 12, 14, 16 is coupled to a terrain or contour following mechanism described with particularity hereinbelow. The depth that the blades 70 not coupled to the terrain contour mechanisms are allowed to cut into the ground or soil is adjustable by raising or lowering the overall frame, consisting of middle frame 12, right frame 14, and left frame 16. The adjustment is accomplished and maintained by a hydraulic system. In this manner, the depth of cut of these blades 70 is adjustably setable by adjustably setting the vertical height of the overall plow frame with respect to the ground. This mode of adjustment coupled with the pitch adjustment ability of the overall plow frame as described above, allows great flexibility in blade plowing characteristics.

Setting of the vertical height of the frame relative to the ground and thus the depth of cut of the non-terrain contour mechanism blades is accomplished through a hydraulic single point depth control system that includes individual blade depth adjustment mechanisms associated with each frame section 12, 14, 16. Although not shown, the outer frame sections 14 and 16 additionally include screw adjustment cylinders associated with the blade depth adjustment mechanisms. The screw adjustment cylinders are used to initially level the outer frame sections 14 and 16 with respect to the center frame section 12 which does not have the screw adjustment mechanisms.

The overall frame is also carried by the collective individual blade depth adjustment mechanisms that do so by raising or lowering the overall frame. Referring to FIG. 1, the individual blade depth adjustment mechanisms will be described. The right frame section 14 includes a wheel 72 that is coupled at the end of a bottom strut or arm 74. The bottom strut 74 is attached at the other end to a pivot tube or rockshaft 76 that is coupled to the frame 14 so as to pivot or rotate independently thereof. Attached to the top of the bottom strut 74 near the rockshaft 76 and to the front cross-member 45 of the frame 14 is a linkage 73. The linkage 73 is formed by two members pivotally coupled (pivot point of the linkage) to one another, with one member coupled at its other end to the rockshaft 76, and with the other member pivotally coupled at its other end to the front cross-member 45. This constitutes one of the individual blade depth or frame height adjustment mechanisms. Coupled at the pivot point of the linkage 73 is one end of a hydraulic depth control cylinder 75. The other end of the hydraulic depth control cylinder 75 is coupled to the bottom strut 74 at approximately the midpoint thereof.

The middle frame 12 likewise includes a pivot tube or rockshaft 77 that is rear mounted thereon for pivotal or rotative movement relative to the middle frame 12 and that extends the substantial length of the middle frame 12. Attached to the right side of the pivot tube 77 is a bottom strut or arm 78 that carries dual wheels 80, 106 at the opposite end. These dual wheels 80, 106 are known as walking dual wheels. Extending from the bottom strut 78 to the front cross-member 19 of the middle frame 12 is a linkage 79. In like manner to the linkage 73, the linkage 79 is formed by two members pivotally coupled (the pivot point of the linkage) to one another, with one member coupled at its other end to the right side rockshaft 77, and with the other member pivotally coupled at its other end to the front cross-member 19. This constitutes another one of the individual blade depth adjustment mechanisms. A hydraulic depth control cylinder 81 is coupled at one of its ends to the pivot point of the linkage 79 with the other end of the hydraulic depth control cylinder 81 coupled to the bottom strut 78.

Attached to the left side of the pivot tube 77 is a bottom strut or arm 82 that carries walking dual wheels 83, 108 at the end opposite the connection to the pivot tube 77. Extending from the bottom strut 82 to the front cross-member 57 of the left frame 16 is a linkage 84. Again, in like manner to the linkages 73 and 79, the linkage 84 is formed by two members pivotally coupled (the pivot point of the linkage) to one another, with one member coupled at its other end to the left side of the rockshaft 77, and with the other member pivotally coupled at its other end to the front cross-member 19. This constitutes yet another one of the individual blade adjustment mechanisms. A hydraulic depth control cylinder 85 is coupled at one end to the pivot point of the linkage 84 with the other end of the hydraulic depth control cylinder 85 coupled to the bottom strut 82.

The left frame 16 includes a pivot tube or rockshaft 86 that is pivotally or rotatably mounted thereon. A bottom strut or arm 87 is attached at one end to the pivot tube 86 and carries a wheel 88 at the other end. Attached between the bottom strut 87 and the front cross-member 57 of the frame 16 is a linkage 89. Again, in like manner to the linkages 73, 79, and 84, the linkage 89 is formed by two members pivotally coupled (the pivot point of the linkage) to one another, with one member coupled at its other end to the rockshaft 86, and with the other member pivotally coupled at its other end to the front cross-member 57. This constitutes still another one of the individual blade adjustment mechanisms. Coupled at the pivot point of the linkage 89 is one end of a hydraulic depth control cylinder 90. The other end of the hydraulic depth control cylinder 90 is coupled to the bottom strut 87.

Thus, the middle frame 12 carries two individual hydraulic blade depth adjustment mechanisms, the right frame 14 carries one individual hydraulic blade depth adjustment mechanism, and the left frame 16 carries one individual hydraulic blade depth adjustment mechanism for a total of four (4) blade depth adjustment mechanisms. The individual blade depth adjustment mechanisms are all coupled to a hydraulic system that is powered by and coupled to the hydraulic take-off of the tractor. In addition to the co-acting individual depth adjustment or flex mechanisms described above, adjustment of the blades is accomplished through a hydraulic system. All of the individual blade depth adjustment mechanisms which are hydraulic are coupled to the blade depth adjustment control 92 that is in turn coupled to a rebound compensator valve or anti-creep valve 210 which is in turn coupled to the hydraulic take-off of the tractor.

Figure 2:
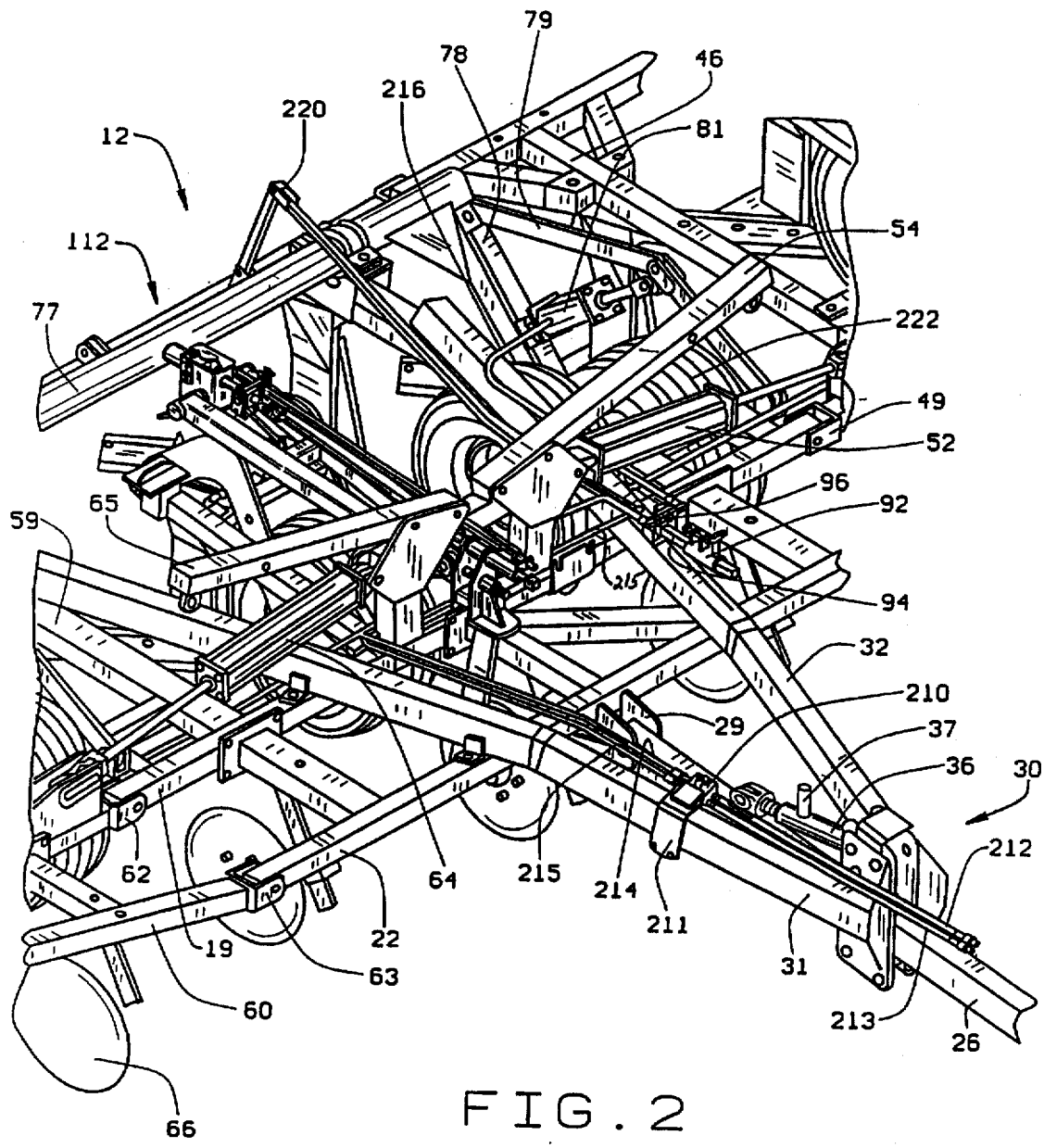
FIG. 2 is an enlarged partial view of the blade plow showing the center frame section, the hydraulic system and fixed blade depth controller.

With reference to FIG. 2, adjustment of the depth of cut of the "fixed" blades 70 or, stated another way, the vertical height of the frame relative to the ground will be described. FIG. 2 is an enlarged view of the middle frame 12 depicting the hydraulic system. As indicated above, all of the individual blade depth adjustment mechanisms are hydraulically coupled to the blade depth adjustment control 92 and thus coact concurrently. Because of this, only the right hand middle frame individual blade depth adjustment mechanism will be referenced.

Hydraulic fluid from the hydraulic take-off of the tractor enters the blade adjustment system through two (2) hoses or lines 212, 213 located on the tongue 26. These lines 212, 213 are coupled to the hydraulic take-off in a known manner. Because it is important to maintain the blade depth at the set blade depth, the hydraulic lines 212, 213 feed into the anti-creep valve 210 that is held onto the left tongue support member 31. The anti-creep valve increases the accuracy of the depth control. A type of anti-creep valve may be that as disclosed in U.S. Pat. No. 4,825,655 entitled "Master/Slave Hydraulic System with Rebound Compensation" issued May 2, 1989 to Buchl et al. and specifically incorporated herein by reference. Another valve that performs substantially the same function in substantially the same manner and achieves substantially the same function as the valve disclosed in the above-referenced '655 patent is one manufactured by Prince Manufacturing Corporation of P.O. Box 537, Sioux City, Iowa 51102-0537 known as an RB-45-650 Rebound Valve, part #HC-V-P37. However, other similar type functioning valves and control systems may be used.

From the valve 210, one hydraulic line 215 feeds into the single point depth stroke control valve 96 of the single point depth control 92. From the single point depth control 92, lines 217 and 218 feed into the base of the master cylinders 81 and 85 on the center frame section 12. The master cylinders 81 and 85 are hydraulically coupled to the slave cylinders 75 and 90 in like manner to U.S. Pat. No. 4,825, 655 incorporated by reference hereinabove. However, other types of master slave hydraulic systems may be utilized. From the cylinders line 214 returns into the anti-creep valve 210.

The blade depth adjustment control 92 is a means of controlling the cutting depth of the blades into the soil, and by which to hydraulically lock the hydraulic depth control cylinders 75, 81, 85, 87 and show increments of depth in relationship to the actual depth of cut of the V-blades in the field from one adjustment point. With additional reference to FIG. 3, the blade depth adjustment control 92 includes a linkage tube 94 that is coupled via link 220 to the rockshaft 77 on the plow. Rotation of the rockshaft 77 by contact through the wheel 222 in contact with the ground moves the link 220 and thus the linkage tube 94 fore and aft as indicated by the double-headed arrow. The stroke control valve 96 is fixedly mounted with relation to the linkage tube 94 but allows slidable movement of the linkage tube 94 therethrough.

The stroke control valve 96 is hydraulically coupled to the master hydraulic depth control cylinders 81 and 85, and the anti-creep valve 210 via lines 214, 215, 217 and 218 to control the expansion or contraction of the master hydraulic depth control cylinders 81 and 85, and the slave hydraulic control cylinders 75 and 90. The expansion and contraction of the hydraulic depth control cylinders 75, 81, 85, and 90 through the respective linkages 73, 79, 84, and 89, causes the frames 12, 14, and 16 to raise and lower, thereby changing the depth of cut of the V-blades. As the hydraulic depth control cylinders 75, 81, 85, and 90 expand and contract, the pivoting relationship of the respective linkage 73, 79, 84, and 89 to the right, middle and left frame sections, 14, 12, and 16 respectively and to the rockshafts 76, 77, and 86 respectively presses against the tires 72, 80, 106, 83, 108, and 88 held by attachment to the rockshafts 76, 77, 86 by bottom struts 74, 78, 82, and 87 respectively to raise or lower the particular frame section 14, 12, 16 to raise or lower the overall plow frame.

As the linkage tube 94 is moved fore and aft, a depth controller 98 having a pin 99 that is fixed to the linkage tube 94, moves to contact the stroke control valve 96. The contact between the pin 99 of the depth controller 98 and the stroke control valve stops the flow of hydraulic fluid to the hydraulic depth control cylinders 75, 81, 85, and 90. This prevents the plow from lowering towards the ground any further. A pointer 100 indicates the true depth of cut of the blades within the soil on a scale 101.

In operation of the blade adjustment, when the cylinder 81 is extended, oil from the tractor goes into the anti-creep valve through line 212. The fluid then exits from a first port on the anti-creep valve 210 through a free flow check or counterbalance and out a second port to the single point depth control valve 96. The single point depth control valve 96 stops the flow of fluid setting the blades at the desired depth. The pressure applied to the first port opens the pilot operated check valve. This allows oil to return from the rod end of the cylinder 81 into a fourth port and out a third port and the back into the tractor. When the cylinders are lowered, oil goes from tractor to the third port, through the free flow check of pilot check, and then through a pressure reducing cartridge and out the fourth port to the rod end of cylinder 81. The pressure at the third port pilots the counterbalance valve open and allows oil from the base of the cylinders to return to the tractor. When the depth stops are reached, the pressure reducing valve limits the pressure at the fourth port to 650 PSI. This keeps the hydraulic lines from being unnecessarily pressurized to full tractor pressure of 2500 PSI but does not interfere with the detent release of tractor valve. By limiting this pressure, the rebound effect is much less apparent.

With reference again to FIG. 1, each frame section 12, 14, and 16 includes a ground contour following or flex mechanism 112, 114, and 116 respectively, that is disposed between or in the center of the remaining two V-blades 70 of each frame section 12, 14, 16. Each ground contour following or center flex mechanism 112, 114, 116 is coupled to a V-blade 70 and functions to vertically raise or lower the attached V-blade 70 when ground contours are encountered independently of the other fixed V-blades attached to the frames. The ability of the center V-blade of each frame section to flex while the other two adjacent V-blades remain at a fixed depth with respect to the frame allows a forty-four inch (44") field flex. Stated another way, the plow with the centerflex mechanisms has the ability to flex and follow the contour of the ground every forty-four inches (44"). Thus, if the center V-blades encounter a hill or valley, while the other blades do not, the center blade will maintain the same depth as the fixed blades. Because each centerflex mechanism is identical in structure, function, and operation, generally only one such centerflex mechanism will be hereinbelow described.

Figure 4:
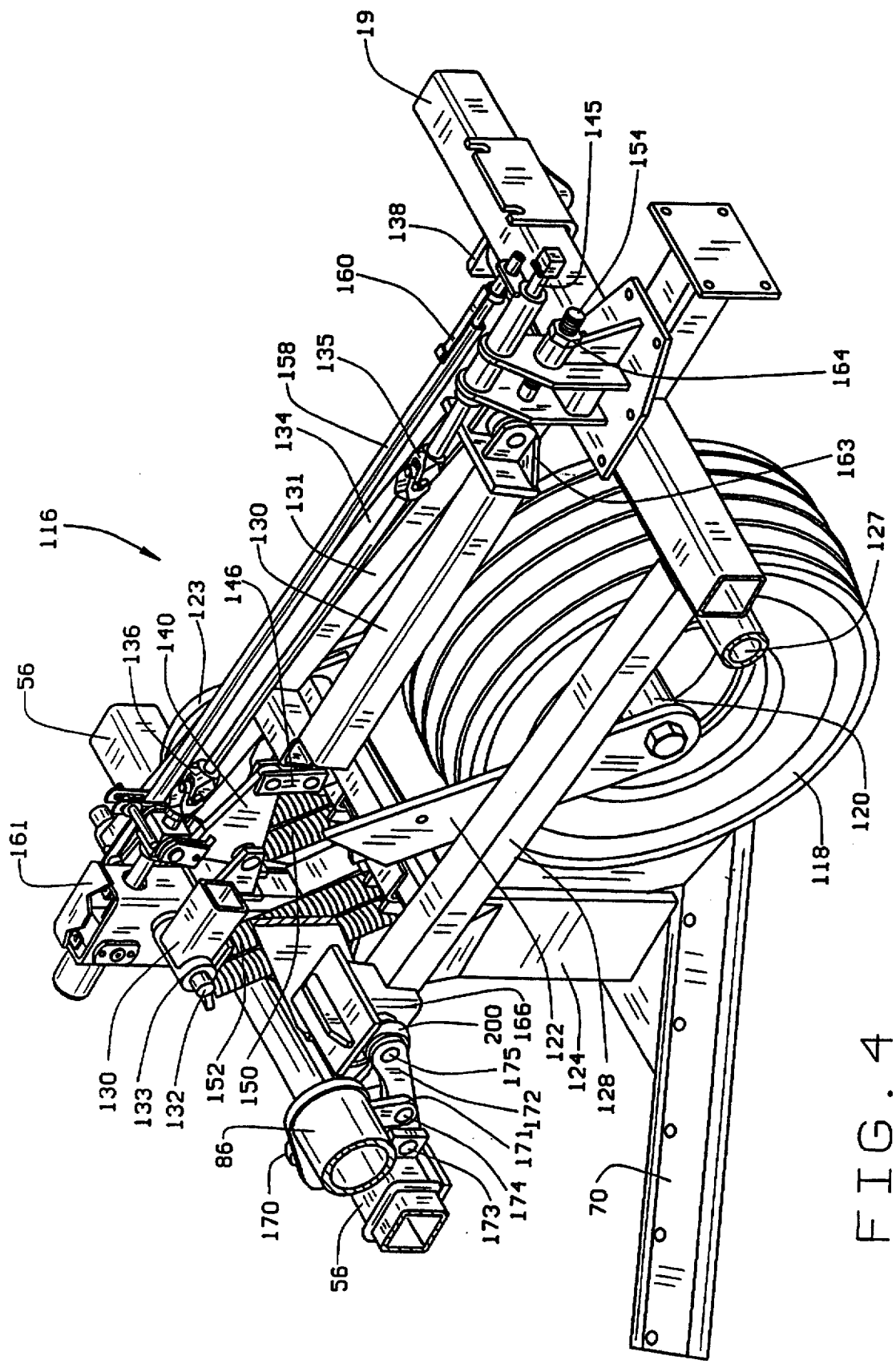
FIG. 4 is an enlarged perspective view of one of the outer frame ground contour mechanisms.
Figure 5:
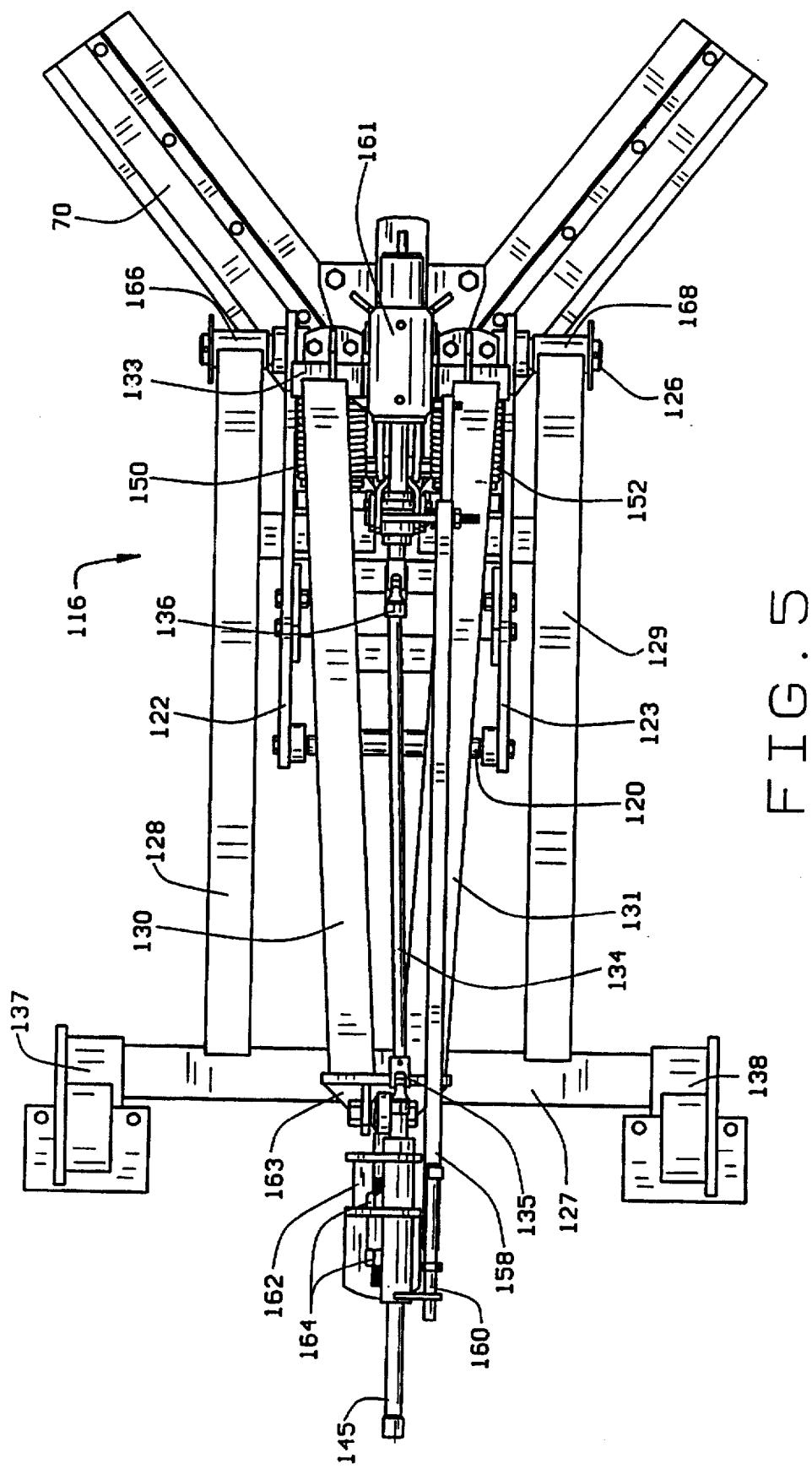
FIG 5 is an enlarged top view of the ground contour mechanism of FIG. 4.

Referring now to FIGS. 4 and 5 there is shown the centerflex mechanism 116 associated with the left frame 16. The centerflex mechanism 116 includes a tire 118 that is associated with a wheel axle 120. The tire 118 is coupled via the axle 120 to a left arm 122 and a right arm 123. Each arm 122, 123 extends from the axle 120 to a standard support column 161 to which is mounted a central standard 124. The arms 122, 123 are pivotally attached to the standard support column 161 by a lower rear shaft 126 that extends through the standard support column 161. The V-blade 70 is attached to the end of the standard 124. Extending from the lower rear shaft 126 is a lower frame consisting of a left member 128 and a right member 129 that is pivotally coupled at one end to the lower rear shaft 126 and pivotally coupled to a front shaft 127 at the other end. FIG. 3 depicts a top view of the centerflex mechanism 116. In this depiction, it is easily seen that the lower frame consisting of the left member 128 and the right member 129 are attached to the front shaft 127 which is pivotally held in left and right lower pivot brackets 137, 138.

Attached to the front cross-member 19 is a bracket 162 that couples the front end of an upper frame consisting of a left member 130, a right member 131 and a pivot bracket 163. The rear end of the upper frame is coupled to a pivot shaft 132. The front end of the upper frame is coupled to the bracket 162. Attached to the bracket 162 is an adjustment rod 134 which, through two universal joints 135 and 136 couple the adjustment rod 134 to a bellcrank mechanism 140, FIG. 7, in order to change the depth of the V-blade 70. The adjustment rod 134 includes threads 142 that is threadedly received in a screw block 144 in the upper portion of the standard support column 161. As the adjustment shaft 145 is turned with a rotating ratchet wrench, the adjustment rod 134 rotates driving the threaded portion 142 either into or out of the screw block 144 depending on the turning direction. This causes the bellcrank mechanism 140 to pivot in turn causing a swivel assembly 146 to push against an arm spacer 148 that is between the arms 122, 123 and coupled to each. This is turn changes the depth that the V-blade 70 will cut into the soil by changing the relationship between the V-blade 70 and the wheel 118.

The cutting depth of the V-blade 70 may be determined by a depth indicator consisting of rod 158 and indicator 160. As the depth setting is changed, the rod 158 will move in and out of the depth indicator tube/pointer 160.

In order to change the pitch of the V-blade 70, it is necessary to adjust the male threaded rod end 154, that is coupled to the upper frame pivot bracket 163 by the loosening and tightening nuts 164. The right and left tension springs 150 and 152 are connected to the left and right hand upper frame members 130 and 131 and to the spring anchor 156 that is part of the lower frame cross member 165.

Figure 6:
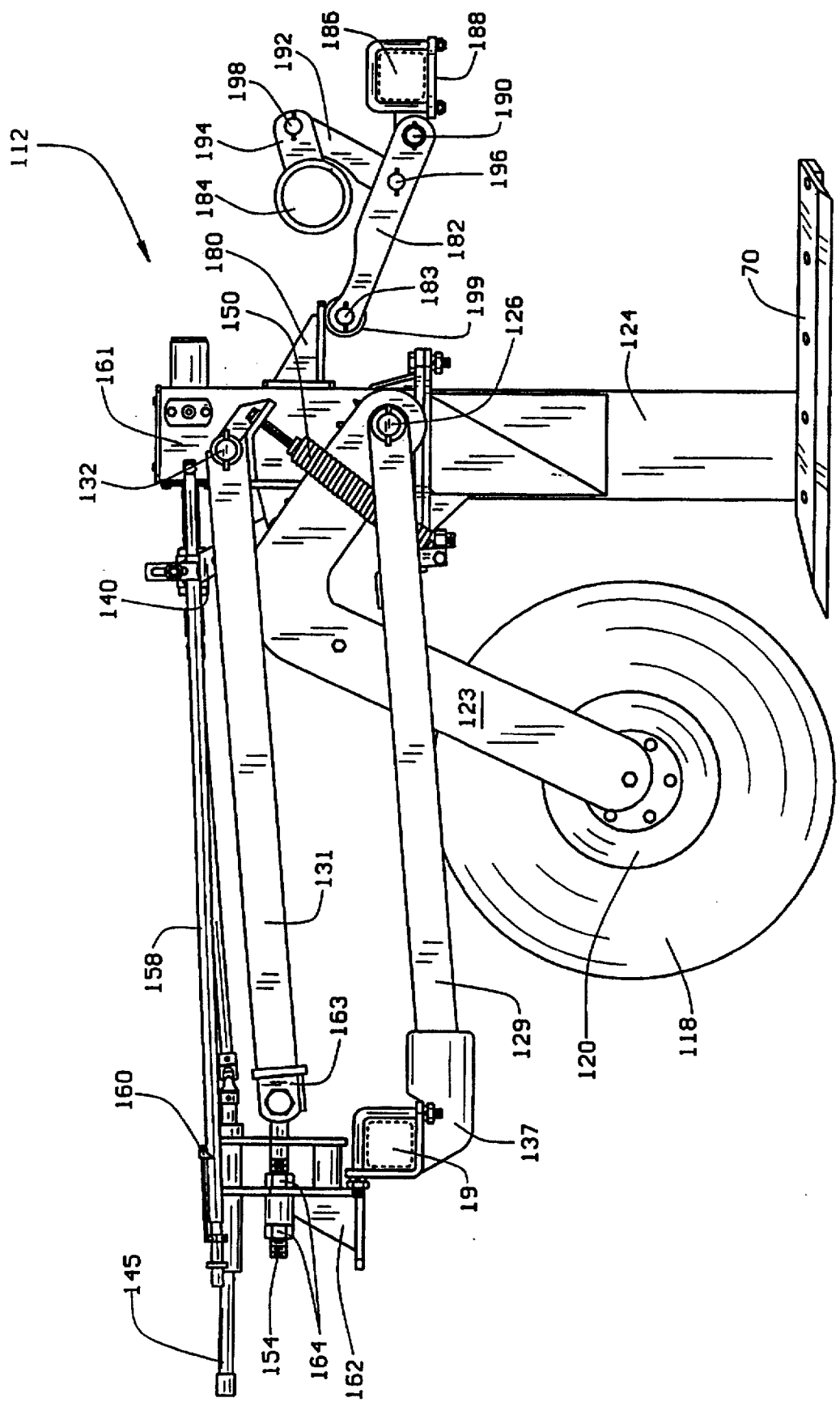
FIG. 6 is an enlarged side elevation view of the center frame ground contour mechanism depicting the roading lift mechanism for the ground contour mechanism as coupled to the rockshaft.
Figure 7:
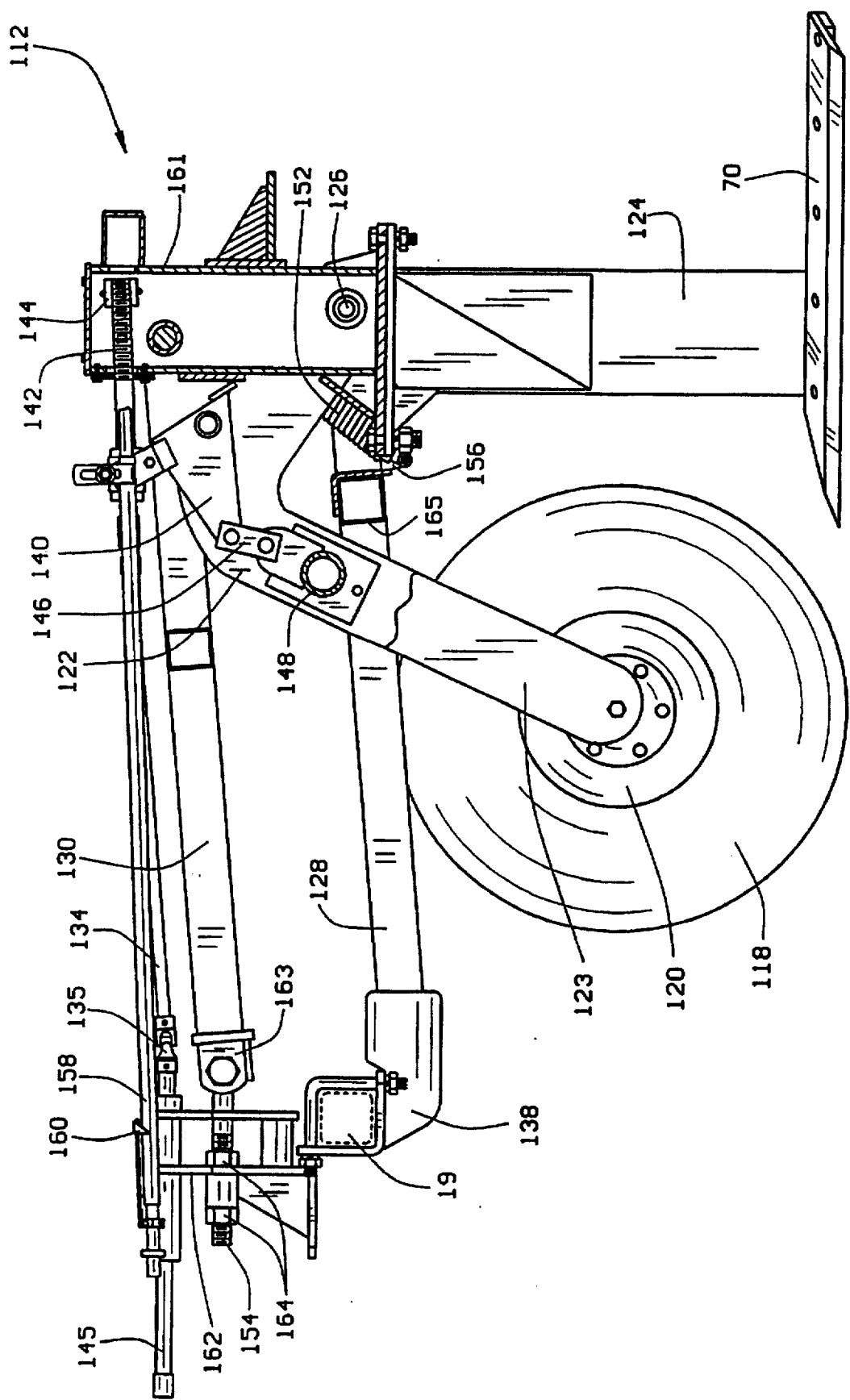
FIG. 7 is an enlarged side elevation view in partial cutaway of the ground contour mechanism of FIG. 6 depicting the blade depth adjustment of the ground contour mechanism without the rockshaft roading lift mechanism.

Referring now to FIG. 6 there is shown a side view of the centerflex mechanism 112. FIG. 7 shows a side view of the centerflex mechanism 112 with the standard support column 161, the standard 124 and the right arm 123 in partial cutaway view to depict the manner in which the initial depth of the V-blade 70 is set.

OPERATION OF THE CENTERFLEX MECHANISM

The particular operation of the centerflex mechanism will now be described. The wheel 118 naturally follows the contour of the ground as the wheel 118 is biased towards the ground. When a low spot is encountered, the naturally biased wheel 118 lowers, thereby lowering the V-blade 70. When a high spot is encountered, the wheel 118 is caused to upwardly move, thereby vertically upwardly raising the V-blade 70. This is accomplished in the following manner:

The vertical motion of the centerflex V-blade 70 is a result of the upper frame consisting of members 130 and 131 and the lower frame consisting of members 128 and 129 acting as a parallelogram linkage system. The upper frame is coupled to the front pivot 163. The lower frame is coupled to the front shaft 127. The rear part of the upper frame consists of a tubular bearings 133 on members 130 and 131. The shaft 132 extends through the standard support column 161 and bearings 133. The lower frame is pivotally coupled to the standard support column 161 and the tubular bearings 166 and 168 by a shaft 126 that extends through the support column 161 and bearings 166 and 168. The rear part of the upper and lower frames coupled to the support column forms the link of the parallelogram system that moves vertically which causes the blade 70 and standard 124 to do likewise.

The tension springs 150, 152 are positioned in the linkage system to cause a downward force on the V-blade 70 by compressing the upper and lower frames together. The springs are adjusted to equal the approximate load that the plow frame exerts on each of the V-blades fastened thereto by its weight. The vertical distance of the wheels from the V-blade is adjustable from the front of the plow. This adjustment moves the bellcrank which raises and lowers the wheel to set the desired depth of cut. Before roading, the plow is raised which in turn rotates the rockshafts. This rotation is linked to other linkages that raises the centerflex mechanisms.

Referring to FIG. 2, the link 170 is fixedly attached to the rockshaft 86. Link 171 is pivotally attached to link 170 and to link 172 at point 174. Link 172 pivots at 173 at the base end and has a roller 200 mounted at the upper end at point 175. The roller contacts the underside of the flat surface on bracket 166. In this manner, as the rockshaft rotates as described hereinabove, the centerflex mechanism 116 is caused to raise for roading.

Additionally, the middle ground contour mechanism 112, referred to in FIG. 4, differs from the outer frame contour mechanisms 114 and 116 in the manner of raising the same for roading. The first link member 194 is fixedly attached to rockshaft 184. The second link 192 is pivotally coupled at 198 and 196. The third link 182, known as the lifting arm, is pivotally coupled to bracket 188 at 190. Contained within the lifting arm 182 at 183 is a roller 199 that contacts the underside flat surface of the flange 180 which is part of the standard support 161. In this manner, as the rockshaft rotates for lifting the plow, the middle ground contour mechanism 112 is caused to raise for roading.

While the foregoing is directed to the preferred embodiment of the present invention, other and further embodiments of the invention may be devised without departing from the basic scope thereof, and the scope thereof is determined by the claims which follow.

What is claimed is:

1. A blade plow comprising:

a middle frame carried by a plurality of middle support wheels, said middle frame including;

first and second middle sweep blades vertically extending from said middle frame; and a middle centerflex mechanism coupled to said middle frame between said first and second middle sweep blades and movable independent of said middle frame and middle sweep blades, said middle centerflex mechanism including a middle ground wheel and a third middle sweep blade variably vertically setable relative to said middle centerflex mechanism to variably set penetration depths of said third middle sweep blade within the ground, said middle centerflex mechanism allowing said third sweep blade to vertically follow vertical movement of said middle ground wheel while maintaining a vertical setting of said third middle sweep blade relative to said middle centerflex such that said third middle sweep blade maintains penetration depth thereof within the ground;

a left frame hingedly coupled to the left side of said middle frame and carried by a plurality of left support wheels, said left frame including;

first and second left sweep blades vertically extending from said left frame; and a left centerflex mechanism coupled to said left frame between said first and second left sweep blades and movable independent of said left frame and left sweep blades, said left centerflex mechanism including a left ground wheel and a third left sweep blade variably vertically setable relative to said left centerflex mechanism to set variably penetration depths of said third left sweep blade within the ground, said left centerflex mechanism allowing said third left sweep blade to vertically follow the vertical movement of said left ground wheel while maintaining a vertical setting of said third left sweep blade relative to said left centerflex such that said third left sweep blade maintains penetration depth thereof within the ground; and a right frame hingedly coupled to the right side of said middle frame and carried by a plurality of right support wheels, said right frame including;

first and second right sweep blades vertically extending from said right frame; and a right centerflex mechanism coupled to said right frame between said first and second right sweep blades and movable independent of said right frame and right sweep blades, said right centerflex mechanism including a right ground wheel and a third right sweep blade variable vertically setable relative to said right centerflex mechanism to variable set penetration depths of said third right sweep blade within the ground, said right centerflex mechanism allowing said third right sweep blade to vertically follow a vertical movement of said right ground wheel while maintaining the vertical setting of said third right sweep blade relative to said right centerflex such that said third right sweep blade maintains penetration depth thereof within the ground;

said middle, left and right first and second sweep blades all concurrently vertically setable relative to each other.

2. The blade plow of claim 1, wherein each said centerflex mechanism includes a standard carrying said respective third sweep blade, an upper frame, and a lower frame, said upper frame pivotally coupled at one end to on said respective frame and at another end to said standard, said lower frame pivotally coupled at one end to said respective frame below the opposite connection of said upper frame, and at the other end to said standard below upper frame and at the other end to said standard below the upper frame pivot connection, said upper and lower frames providing a pivoting parallelogram.

3. The blade plow of claim 1, wherein said plow includes a single point depth control assembly disposed at the front of the plow to vertically set the depth of cut of said blades through a single control.

4. A blade plow comprising:

a first rigid frame section having at least a 12' width and carried on wheels;

a second rigid frame section having at least a 12' width and carried on wheels;

a third rigid frame section having at least a 12' width and carried on wheels;

said first rigid frame section pivotably coupled at one side to a first side of said second rigid frame section;

said third rigid frame section pivotably coupled at one side to a second side of said second rigid frame section, opposite to said first side;

each said first, second and third rigid frame sections having a plurality of sweep blades adjustably fixable in depth relative to ground and a contour following mechanism disposed in a middle portion thereof, said contour following mechanism adjustably fixable in depth relative to ground independent of said plurality of sweep blades.

5. The blade plow of claim 4, further comprising:

a tongue coupled to said second frame and angularly adjustable with respect to pitch therebetween.

6. The blade plow of claim 4, wherein each said plurality of sweep blades adjustably fixable in depth is at least 4' in width.

7. The blade plow of claim 4, wherein each said contour following mechanism vertically raises and lowers an integral sweep blade within the soil in direct correlative response to ground contour to maintain the integral sweep blade of the contour following mechanism at the same depth as said plurality of sweep blades adjustably fixable in depth.

8. The blade plow of claim 7, wherein each said integral sweep blade of the respective contour following mechanism is at least 4' in width.

* * * * *